United States Patent
Hajmasan et al.

(10) Patent No.: US 10,237,293 B2
(45) Date of Patent: Mar. 19, 2019

(54) DYNAMIC REPUTATION INDICATOR FOR OPTIMIZING COMPUTER SECURITY OPERATIONS

(71) Applicant: Bitdefender IPR Management Ltd., Nicosia (CY)

(72) Inventors: Gheorghe F. Hajmasan, Lunca Muresului (RO); Alexandra Mondoc, Cluj-Napoca (RO); Radu M. Portase, Cluj-Napoca (RO)

(73) Assignee: Bitdefender IPR Management Ltd., Nicosia (CY)

( * ) Notice: Subject to any disclaimer, the term of this patent is extended or adjusted under 35 U.S.C. 154(b) by 260 days.

(21) Appl. No.: 15/336,387

(22) Filed: Oct. 27, 2016

(65) Prior Publication Data
US 2018/0124078 A1    May 3, 2018

(51) Int. Cl.
*H04L 29/06* (2006.01)
*G06F 21/56* (2013.01)

(52) U.S. Cl.
CPC .......... *H04L 63/1425* (2013.01); *G06F 21/56* (2013.01); *H04L 63/145* (2013.01); *H04L 63/1408* (2013.01); *H04L 63/20* (2013.01)

(58) Field of Classification Search
CPC ............... H04L 63/1425; H04L 63/145; H04L 63/1408
See application file for complete search history.

(56) References Cited

U.S. PATENT DOCUMENTS

| | | |
|---|---|---|
| 6,931,540 B1 | 8/2005 | Edwards et al. |
| 7,725,941 B1 | 5/2010 | Pavlyushchik |
| 8,001,606 B1 * | 8/2011 | Spertus .................. G06F 21/564 709/203 |
| 8,225,406 B1 | 7/2012 | Nachenberg |

(Continued)

OTHER PUBLICATIONS

Cesare et al., "Malwise—An Effective and Efficient Classification System for Packed and Polymorhpic Malware," IEEE Transactions on Computers, IEEE, vol. 62, No. 6, New York, NY, USA, Jun. 2013.

(Continued)

*Primary Examiner* — Ali Shayanfar
(74) *Attorney, Agent, or Firm* — Law Office of Andrei D Popovici, PC

(57) ABSTRACT

Described systems and methods allow protecting a computer system from malware such as viruses, worms, and spyware. A reputation manager executes on the computer system concurrently with an anti-malware engine. The reputation manager associates a dynamic reputation indicator to each executable entity seen as a unique combination of individual components (e.g., a main executable and a set of loaded libraries). The reputation indicator indicates a probability that the respective entity is malicious. The reputation of benign entities may increase in time. When an entity performs certain actions which may be indicative of malicious activity, the reputation of the respective entity may drop. The anti-malware engine uses an entity-specific protocol to scan and/or monitor each target entity for malice, the protocol (Continued)

varying according to the entity's reputation. Entities trusted to be non-malicious may be analyzed using a more relaxed protocol than unknown or untrusted entities.

22 Claims, 12 Drawing Sheets

(56) References Cited

U.S. PATENT DOCUMENTS

| | | | |
|---|---|---|---|
| 8,327,441 B2 | 12/2012 | Kumar et al. | |
| 8,584,094 B2* | 11/2013 | Dadhia | G06F 21/566 |
| | | | 717/126 |
| 8,635,690 B2 | 1/2014 | Alperovitch et al. | |
| 8,769,676 B1* | 7/2014 | Kashyap | G06F 21/554 |
| | | | 726/22 |
| 8,813,230 B2 | 8/2014 | Fanton et al. | |
| 8,856,933 B2 | 10/2014 | Fanton et al. | |
| 9,147,071 B2* | 9/2015 | Sallam | G06F 21/564 |
| 9,363,282 B1* | 6/2016 | Yu | H04L 63/1425 |
| 9,923,925 B2* | 3/2018 | Albertson | H04L 63/14 |
| 2002/0184362 A1* | 12/2002 | Banerjee | H04L 63/1416 |
| | | | 709/224 |
| 2007/0240222 A1* | 10/2007 | Tuvell | G06F 21/56 |
| | | | 726/24 |
| 2008/0209552 A1* | 8/2008 | Williams | G06F 21/31 |
| | | | 726/22 |
| 2011/0185429 A1 | 7/2011 | Sallam | |
| 2012/0023583 A1* | 1/2012 | Sallam | G06F 21/564 |
| | | | 726/24 |
| 2013/0074186 A1 | 3/2013 | Muttik | |
| 2013/0145472 A1* | 6/2013 | Ramabhatta | G06F 21/566 |
| | | | 726/25 |
| 2013/0227636 A1* | 8/2013 | Bettini | H04W 12/12 |
| | | | 726/1 |
| 2014/0283065 A1* | 9/2014 | Teddy | H04L 63/145 |
| | | | 726/23 |
| 2014/0289853 A1* | 9/2014 | Teddy | H04L 63/1416 |
| | | | 726/23 |
| 2015/0096018 A1* | 4/2015 | Mircescu | G06F 21/56 |
| | | | 726/23 |
| 2016/0092682 A1* | 3/2016 | Adams | G06F 21/56 |
| | | | 726/23 |
| 2016/0359887 A1* | 12/2016 | Yadav | H04L 63/1425 |
| 2017/0195346 A1* | 7/2017 | Be'Ery | H04L 63/0428 |
| 2018/0124078 A1* | 5/2018 | Hajmasan | H04L 63/1425 |
| 2018/0343272 A1* | 11/2018 | Khalil | H04L 63/1425 |

OTHER PUBLICATIONS

European Patent Office, International Search Report and Written Opinion dated Feb. 5, 2018 for PCT International Application No. PCT/EP2017/077390, international filing date Oct. 26, 2017, priority date Oct. 27, 2016.

* cited by examiner

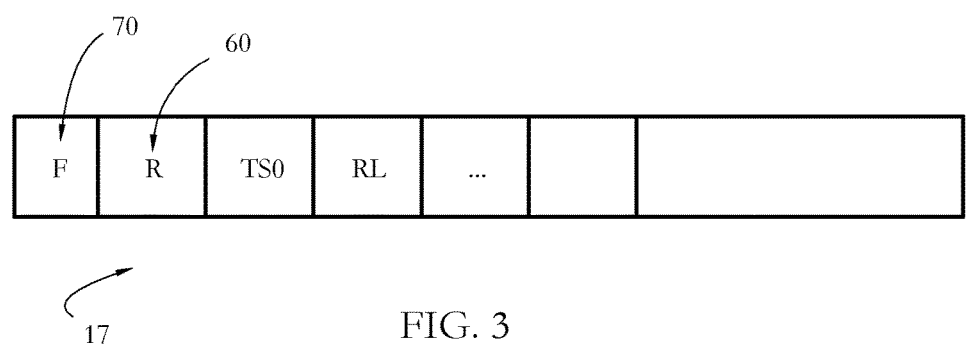
FIG. 3
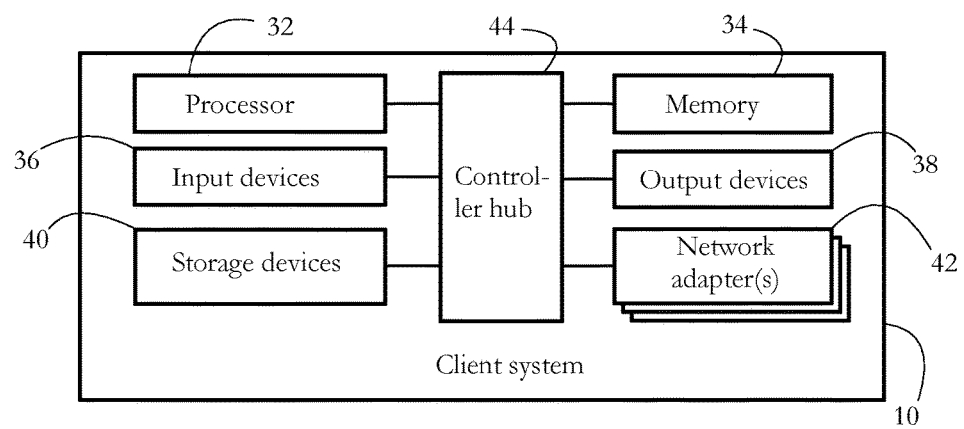
FIG. 4-A

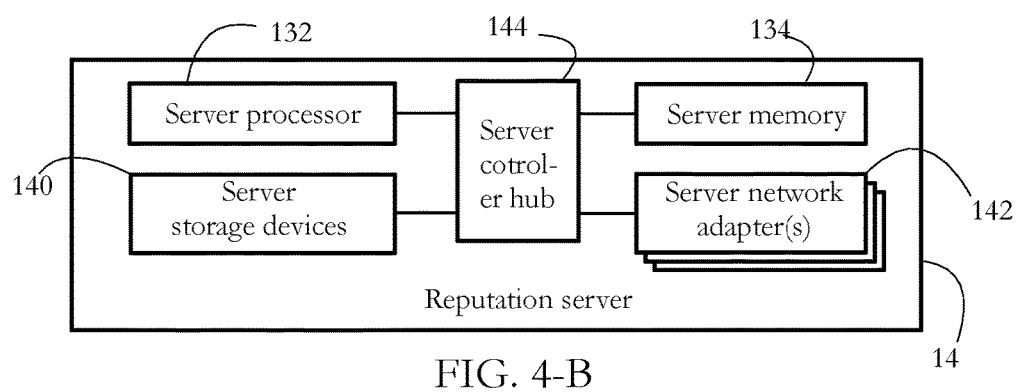
FIG. 4-B
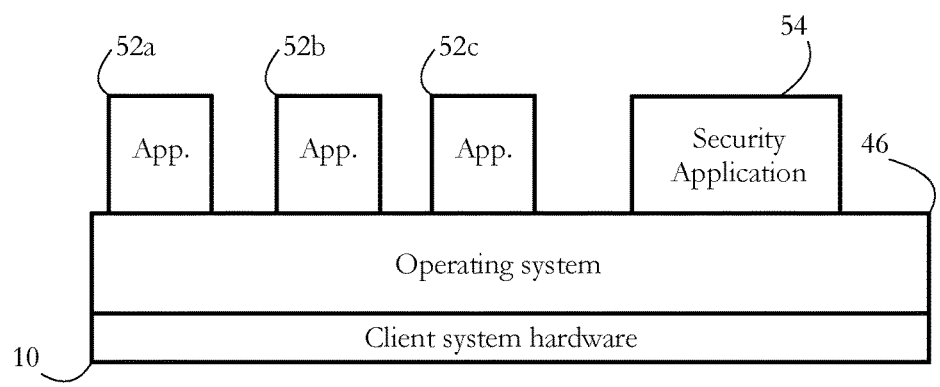
FIG. 5

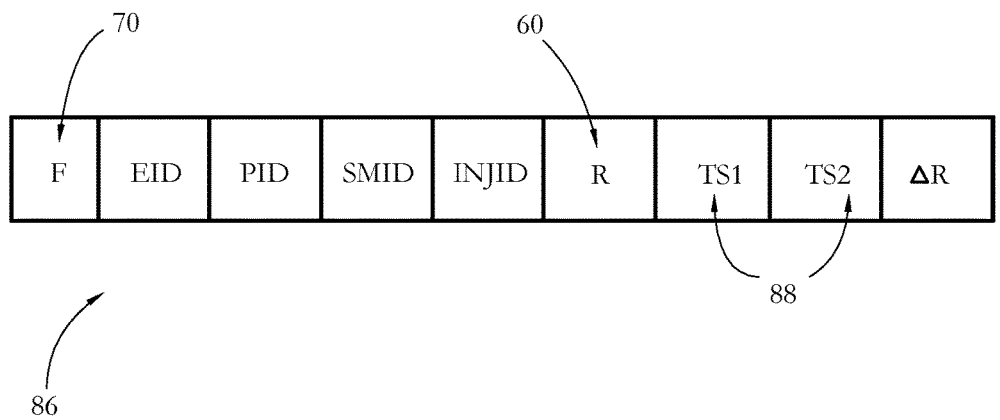
FIG. 11
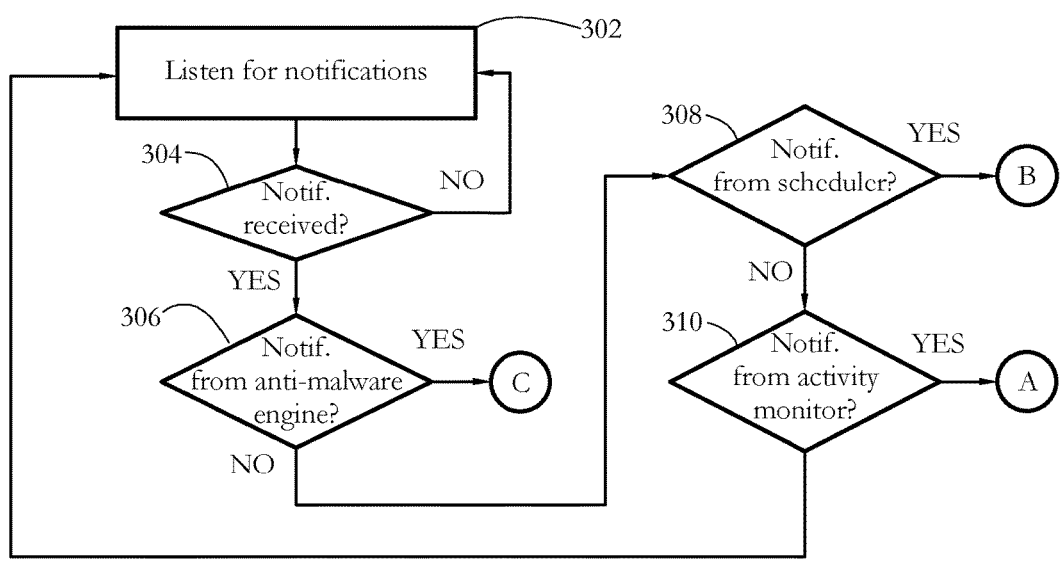
FIG. 12-A

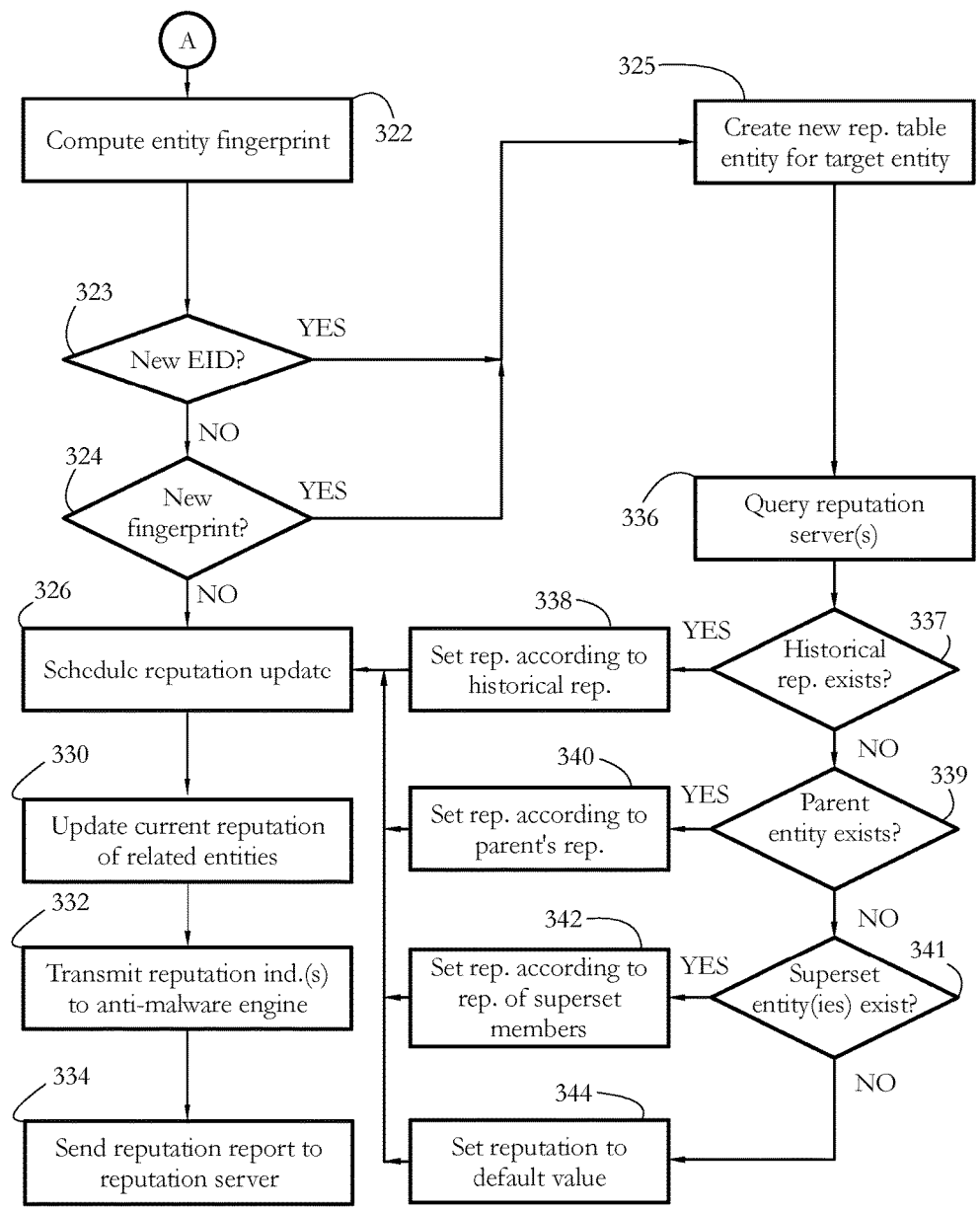
FIG. 12-B

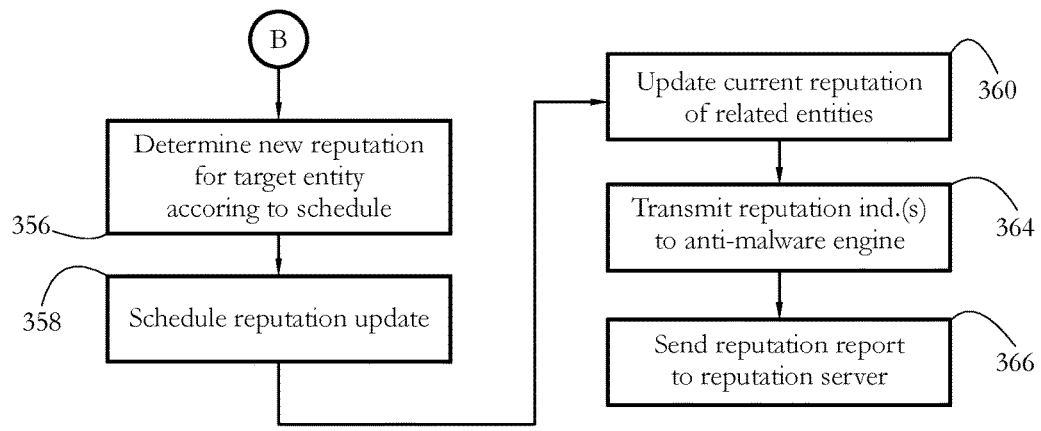
FIG. 12-C
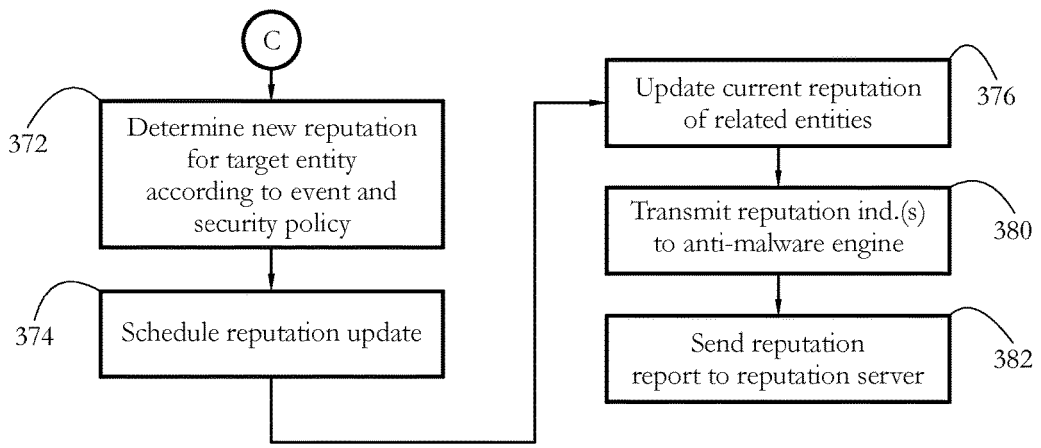
FIG. 12-D

DYNAMIC REPUTATION INDICATOR FOR OPTIMIZING COMPUTER SECURITY OPERATIONS

BACKGROUND

The invention relates to systems and methods for protecting computer systems from malicious software.

Malicious software, also known as malware, affects a great number of computer systems worldwide. In its many forms such as computer viruses, worms, rootkits, and spyware, malware presents a serious risk to millions of computer users, making them vulnerable to loss of data and sensitive information, invasion of privacy, identity theft, and loss of productivity, among others.

Security software may be used to detect malware infecting a user's computer system, to remove, and/or to incapacitate such malware. Several malware-detection techniques are known in the art. Some are content based, relying on matching a fragment of code of the malware agent to a library of malware-indicative signatures. Other conventional techniques, commonly known as behavioral, detect a set of suspicious or malware-indicative actions of the malware agent.

Security software may place a significant computational burden on a user's computer system, often having a measurable impact on performance and user experience. The continuous proliferation of malicious software further increases the complexity of malware detection routines, as well as the size of signature databases. To lower computational costs, security software may incorporate various optimization procedures.

SUMMARY

According to one aspect, a client system comprises at least one hardware processor configured to execute a target entity, a reputation manager, and an anti-malware engine. The reputation manager is configured in response to receiving a first reputation indicator of a target entity from a reputation server, the first reputation indicator indicative of a probability that the target entity is malicious, to transmit the reputation indicator to the anti-malware engine. The reputation manager is further configured, in response to receiving the first reputation indicator, to determine whether the target entity has performed any of a set of pre-determined actions during a first time interval. When the target entity has not performed any of the set of pre-determined actions during the first time interval, the reputation manager determines a second reputation indicator of the target entity, the second reputation indicator indicating that the target entity is less likely to be malicious than indicated by the first reputation indicator. The reputation manager further transmits the second reputation indicator to the anti-malware engine and to the reputation server. When the target entity has performed a first action of the set of pre-determined actions, the reputation manager determines a third reputation indicator of the target entity, the third reputation indicator indicating that the target entity is more likely to be malicious than indicated by the first reputation indicator. The reputation manager further transmits the third reputation indicator to the anti-malware engine and to the reputation server. The anti-malware engine is configured, in response to receiving the first reputation indicator, to employ a first protocol to determine whether the target entity is malicious. The anti-malware engine is further configured, in response to receiving the second reputation indicator, to employ a second protocol to determine whether the target entity is malicious, wherein the second protocol is less computationally expensive than the first protocol. The anti-malware engine is further configured, in response to receiving the third reputation indicator, to employ a third protocol to determine whether the target entity is malicious, wherein the third protocol is more computationally expensive than the first protocol.

According to another aspect, a server computer system comprises at least one hardware processor configured to perform reputation management transactions with a plurality of client systems, wherein a reputation management transaction comprises, in response to a request received from a client system of the plurality of client systems, retrieving a first reputation indicator of a target entity from an entity reputation database, the first reputation indicator indicative of a probability that the target entity is malicious. The transaction further comprises, in response to retrieving the first reputation indicator, transmitting the first reputation indicator to the client system and in response to transmitting the first reputation indicator, receiving a second reputation indicator of the target entity from the client system. The transaction further comprises, in response to receiving the second reputation indicator, comparing the first and second reputation indicators. In response, when the second reputation indicator indicates a lower probability that the target entity is malicious than indicated by the first reputation indicator, the transaction further comprises adding the second reputation indicator to a collection of reputation indicators received from the plurality of client systems, wherein all members of the collection are determined for instances of the target entity. The transaction further comprises, in response to adding the second reputation indicator to the collection, determining whether a reputation update condition is satisfied, and in response, when the update condition is satisfied, replacing the first reputation indicator in the reputation database with an updated reputation indicator determined according to the collection. Determining the second reputation indicator comprises employing the client system, in response to receiving the first reputation indicator, to determine whether the target entity has performed any of a set of pre-determined actions during a first time interval. When the target entity has not performed any of the set of pre-determined actions during the first time interval, determining the second reputation indicator further comprises formulating the second reputation indicator to indicate that the target entity is less likely to be malicious than indicated by the first reputation indicator, and when the target entity has performed a first action of the set of pre-determined actions, formulating the second reputation indicator to indicate that the target entity is more likely to be malicious than indicated by the first reputation indicator.

According to another aspect, a non-transitory computer-readable medium stores a set of instructions which, when executed by a hardware processor of a client system, cause the client system to form a reputation manager and an anti-malware engine. The client system executes a target entity. The reputation manager is configured in response to receiving a first reputation indicator of a target entity from a reputation server, the first reputation indicator indicative of a probability that the target entity is malicious, to transmit the reputation indicator to the anti-malware engine. The reputation manager is further configured, in response to receiving the first reputation indicator, to determine whether the target entity has performed any of a set of pre-determined actions during a first time interval. When the target entity has not performed any of the set of pre-determined actions during the first time interval, the reputation manager determines a second reputation indicator of the target entity, the second reputation indicator indicating that the target entity is less likely to be malicious than indicated by the first reputation indicator. The reputation manager further transmits the second reputation indicator to the anti-malware engine and to the reputation server. When the target entity has performed a first action of the set of pre-determined actions, the reputation manager determines a third reputation indicator of the target entity, the third reputation indicator indicating that the target entity is more likely to be malicious than indicated by the first reputation indicator. The reputation manager further transmits the third reputation indicator to the anti-malware engine and to the reputation server. The anti-malware engine is configured, in response to receiving the first reputation indicator, to employ a first protocol to determine whether the target entity is malicious. The anti-malware engine is further configured, in response to receiving the second reputation indicator, to employ a second protocol to determine whether the target entity is malicious, wherein the second protocol is less computationally expensive than the first protocol. The anti-malware engine is further configured, in response to receiving the third reputation indicator, to employ a third protocol to determine whether the target entity is malicious, wherein the third protocol is more computationally expensive than the first protocol.

BRIEF DESCRIPTION OF THE DRAWINGS

The foregoing aspects and advantages of the present invention will become better understood upon reading the following detailed description and upon reference to the drawings where:

FIG. 3 shows an exemplary reputation database entry according to some embodiments of the present invention.

FIG. 4-A illustrates an exemplary hardware configuration of a client system according to some embodiments of the present invention.

FIG. 4-B shows an exemplary hardware configuration of a reputation server according to some embodiments of the present invention.

FIG. 5 shows an exemplary set of software objects executing on a client system, including a security application configured to protect the client system from computer security threats according to some embodiments of the present invention.

FIG. 11 shows an exemplary data structure associated to an executable entity executing on a client system, according to some embodiments of the present invention.

FIG. 12-A shows an exemplary sequence of steps performed by the reputation manager component of the security application according to some embodiments of the present invention.

FIG. 12-B shows a continuation of the exemplary sequence of steps of FIG. 11-A according to some embodiments of the present invention.

FIG. 12-C shows another continuation of the exemplary sequence of steps of FIG. 11-A according to some embodiments of the present invention.

FIG. 12-D shows yet another continuation of the exemplary sequence of steps of FIG. 11-A according to some embodiments of the present invention.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Computer security encompasses protecting users and equipment against unintended or unauthorized access to data and/or hardware, against unintended or unauthorized modification of data and/or hardware, and against destruction of data and/or hardware. A computer program is a sequence of processor instructions carrying out a task. Computer programs described in some embodiments of the present invention may be stand-alone software entities or sub-entities (e.g., subroutines, libraries) of other computer programs. Unless otherwise specified, a process represents an instance of a computer program, having a separate memory space and at least an execution thread, the memory space storing an encoding of a set of processor instructions (e.g., machine code). Unless otherwise specified, a hash is an output of a hash function. Unless otherwise specified, a hash function is a mathematical transformation mapping a variable-length sequence of symbols (e.g. characters, bits) to a fixed-length bit string. Computer readable media encompass non-transitory media such as magnetic, optic, and semiconductor storage media (e.g. hard drives, optical disks, flash memory, DRAM), as well as communications links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
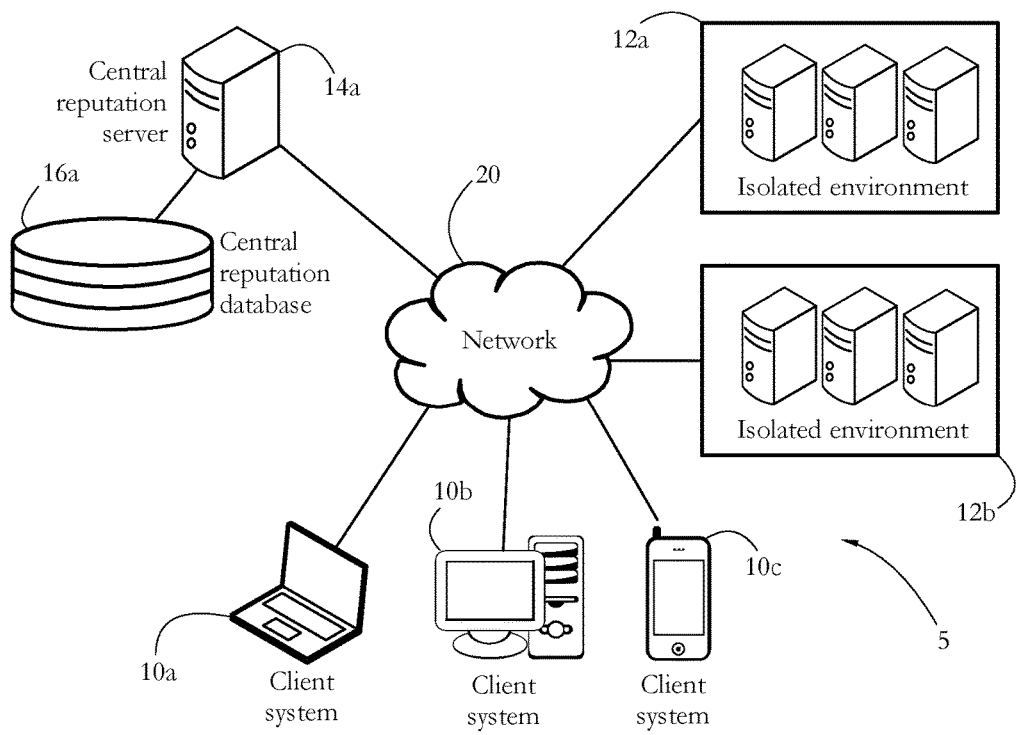
FIG. 1 shows an exemplary anti-malware system comprising a plurality of client systems and a reputation server, according to some embodiments of the present invention.

FIG. 1 shows an exemplary computer security system 5 according to some embodiments of the present invention. System 5 comprises a set of client systems 10a-c and a central reputation server 14a, connected via a communication network 20. Central reputation server 14a may further be communicatively coupled to a central reputation database 16a. Network 20 may be a wide-area network such as the Internet, while parts of network 20 may also include a local area network (LAN).

Figure 2:
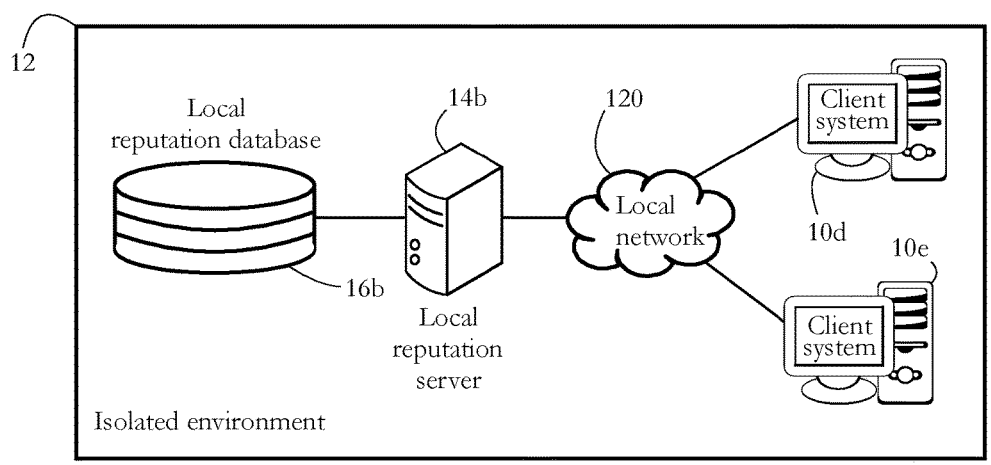
FIG. 2 shows an exemplary detailed view of an isolated environment such as a corporate Intranet, protected from computer security threats according to some embodiments of the present invention.

System 5 may further comprise a set of isolated environments 12a-b connected to network 20. An isolated environment may represent, for instance, a company Intranet. Environments 12a-b may be separated from the rest of network 20 by firewalls and/or other perimeter defense means. FIG. 2 illustrates such an isolated environment 12, comprising a set of client systems 10d-e and a local reputation server 14b, all connected to a local network 120. Network 120 may represent, for instance, a local area network. In some embodiments, isolated environment 12 may further comprise an environment-specific local reputation database 16b, communicatively coupled to local reputation server 14b.

Client systems 10a-e represent end-user computer systems protected against computer security threats according to some embodiments of the present invention. Exemplary client systems 10a-e include personal computers, mobile computing and/or telecommunication devices such as tablet personal computers, mobile telephones, personal digital assistants (PDA), wearable computing devices (e.g., smartwatches), household devices such as TVs or music players, or any other electronic device having a processor and a memory. Client systems 10a-e may represent individual customers of a computer security company; several client systems may belong to the same customer.

Client systems 10a-e may use reputation data to increase the efficiency of computer security operations. In some embodiments, reputation servers 14a-b handle reputation data at the request of client systems 10a-e, for instance to store and selectively retrieve reputation data to/from reputation databases 16a-b, and to transmit such data to a requesting client system. Details of such transactions are given below.

Reputation databases 16a-b may be configured to store reputation data associated with various executable entities (applications, components of an operating system, processes, libraries, scripts, etc.). Reputation data may be stored as a plurality of entries, each entry corresponding to a distinct executable entity. FIG. 3 shows an exemplary reputation database entry 17, comprising an identity token of an executable entity (herein called entity fingerprint 70) and a reputation indicator 60 indicative of a probability that the respective entity is malicious. Each reputation database entry may further comprise a timestamp (symbolized as TSO) indicative of a moment when indicator 60 was created and/or a moment of the latest update of the respective reputation indicator. Entry 17 may further comprise a reputation lifetime indicator (RL) indicative of a duration of validity of the respective reputation indicator. By specifying a limited lifetime for reputation data, some embodiments effectively force a periodic refresh of such data, thus containing the spread of a potential infection with the respective entity. The lifetime indicator may vary among executable entities; reputations of some entities that are proven to be malicious or benign may have an unlimited lifetime. Entity fingerprints and reputation indicators are described in more detail below.

Some embodiments distinguish between a current reputation of an entity and a historical reputation (HR) of the respective entity. The current reputation refers to a reputation of an entity currently residing or executing on a client system. The historical reputation is herein used to denote a value of a reputation indicator previously computed for another instance of the respective executable entity and stored in databases 16a and/or 16b. Historical reputations may comprise reputation data aggregated from other client systems and/or computed at other times in the past. Historical reputations may include a reputation determined for the respective entity by a human security analyst. Such historical reputations may be given more weight in a decision process than reputations determined automatically, since they are likely to be more accurate than the latter.

The exemplary reputation management system illustrated in FIGS. 1-2 is organized in a hierarchical fashion. To minimize latency and improve user experience, client systems 10a-e may first look up reputation data in local reputation database 16b, and then, if needed, may request such data from central reputation database 16a. In some embodiments, local database 16b may therefore be regarded as a local cache of central database 16a. By aggregating reputation data from multiple client systems 10a-e, central reputation database 16a may quickly acquire information about new threats, and distribute it to other client systems.

Configurations as illustrated in FIG. 2 may enable an environment-specific manner of handling reputation data. In some embodiments, local reputation database 16b stores reputation indicators specifically tailored to the respective isolated environment. In one such example, client systems 10d-e of a corporate Intranet run a widely used software application X, such as Microsoft Office®. Application X loads an executable module Y, which is vulnerable to malware as long as the respective client system is connected to the Internet. When client systems 10d-e are not connected to the Internet (for instance, when environment 12 is protected by perimeter defense means), application X no longer suffers from the vulnerabilities associated to Internet connectivity. Therefore, monitoring application X for such vulnerabilities may not be necessary on systems 10d-e (i.e., within isolated environment 12), whereas such monitoring may be important in systems directly connected to the Internet. Equivalently, application X may have a higher trustworthiness within environment 12, compared to outside of environment 12.

In another example of environment-specificity, an enterprise uses a proprietary software application X, which is typically not encountered outside isolated environment 12. Reputation data associated with application X is therefore not likely to be used by other client systems. In some embodiments, such reputation data is only saved in environment-specific reputation database 16b, and not in central reputation database 16a. Such configurations may increase the efficiency of database lookups for clients operating outside isolated environment 12, as well as for clients operating inside environment 12.

FIG. 4-A shows an exemplary hardware configuration of a client system 10 such as client systems 10a-e of FIGS. 1-2, according to some embodiments of the present invention. Client system 10 may represent a corporate computing device such as an enterprise server, or an end-user device such as a personal computer or a smartphone, among others. FIG. 4-A shows a computer system for illustrative purposes; other client systems such as mobile telephones or wearables may have a different configuration. Client system 10 comprises a processor 32, a memory unit 34, a set of input devices 36, a set of output devices 38, a set of storage devices 40, and a set of network adapters 42, all connected by a controller hub 44.

Processor 32 comprises a physical device (e.g. microprocessor, multi-core integrated circuit formed on a semiconductor substrate) configured to execute computational and/or logical operations with a set of signals and/or data. In some embodiments, such logical operations are delivered to processor 32 in the form of a sequence of processor instructions (e.g. machine code or other type of software). Memory unit 34 may comprise non-transitory computer-readable media (e.g. RAM) storing data/signals accessed or generated by processor 32 in the course of carrying out instructions. Input devices 36 may include computer keyboards, mice, and microphones, among others, including the respective hardware interfaces and/or adapters allowing a user to introduce data and/or instructions into client system 10. Output devices 38 may include display screens and speakers among others, as well as hardware interfaces/adapters such as graphic cards, allowing system 10 to communicate data to a user. In some embodiments, input devices 36 and output devices 38 may share a common piece of hardware, as in the case of touch-screen devices. Storage devices 40 include computer-readable media enabling the non-transitory storage, reading, and writing of software instructions and/or data. Exemplary storage devices 40 include magnetic and optical disks and flash memory devices, as well as removable media such as CD and/or DVD disks and drives. The set of network adapters 42 enables client system 10 to connect to networks 20, 120, and/or to other devices/computer systems. Controller hub 44 generically represents the plurality of system, peripheral, and chipset buses, and/or all other circuitry enabling the inter-communication of the illustrated hardware devices. For example, hub 44 may comprise the northbridge connecting processor 32 to memory 34, and/or the southbridge connecting processor 32 to devices 36-38-40-42, among others.

FIG. 4-B shows an exemplary hardware configuration of a reputation server 14, which may represent central reputation server 14a in FIG. 1 or local reputation server 14b in FIG. 2. Server 14 comprises a server processor 132, a server memory 134, a set of server storage devices 140, and a set of network adapters 142, all connected by a server controller hub 144. The operation of devices 132, 134, 140, and 142 may mirror that of devices 32, 34, 40, and 42 described above. For instance, server processor 132 may comprise an integrated circuit configured to execute computational and/or logical operations with a set of signals and/or data. Server memory 134 may comprise non-transitory computer-readable media (e.g. RAM) storing data/signals accessed or generated by processor 132 in the course of executing computations. Network adapters 142 enable server 14 to connect to a computer network such as networks 20, 120. In some embodiments, reputation server 14 consists of a software component executing on a client system, as further shown below.

FIG. 5 shows an exemplary set of software objects executing on client system 10 according to some embodiments of the present invention. A guest operating system (OS) 46 comprises software that provides an interface to the hardware of client system 10, and acts as a host for a set of software applications 52a-c and 54. OS 46 may include any widely available operating system such as Windows®, MacOS®, Linux®, iOS®, or Android™, among others. Applications 52a-c generically represent any user application, such as word processing, image processing, database, browser, and electronic communication applications, among others. In some embodiments, a security application 54 is configured to perform anti-malware and/or other operations as detailed below, in order to protect client system 10 from computer security threats. Security application 54 may be a standalone program or may form part of a software suite. Security application 54 may execute, at least in part, at a kernel level of processor privilege.

In an alternative embodiment to the one illustrated in FIG. 5, OS 46 and applications 52a-c may execute within a virtual machine (VM) exposed by a hypervisor executing on client system 10. Such embodiments may be suited for protecting cloud-based architectures such as server farms and infrastructure as a service (IAAS) systems, among others. A virtual machine is commonly known in the art as an abstraction (e.g., software emulation) of a physical computing system, the VM comprising a virtual processor, virtual storage, etc. In such embodiments, security application 54 may execute within or outside the respective VM. When executing outside, security application 54 may execute at the processor privilege level of the hypervisor, or within a separate virtual machine. A single security application may protect a plurality of VMs executing on the respective client system.

Figure 6:
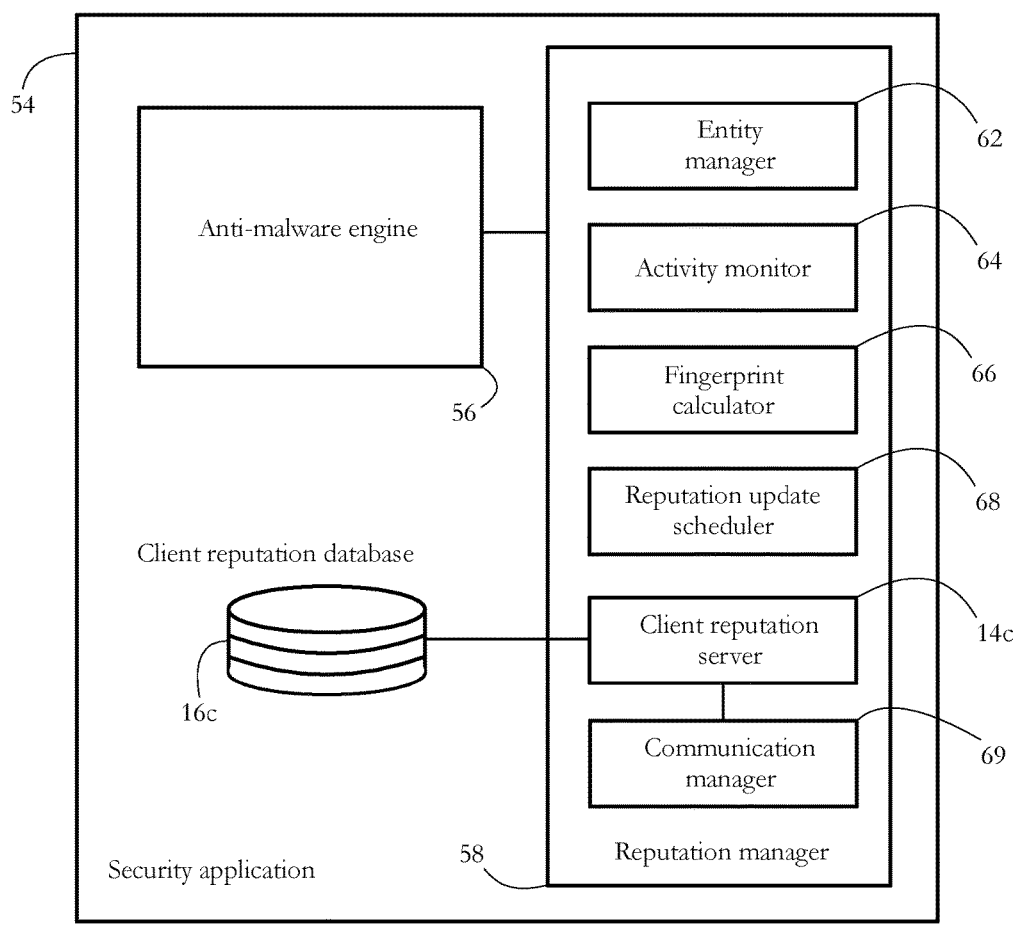
FIG. 6 shows exemplary components of a security application according to some embodiments of the present invention.

FIG. 6 shows exemplary components of security application 54 according to some embodiments of the present invention. Application 54 comprises an anti-malware engine 56 communicatively coupled to a reputation manager 58. Anti-malware engine 56 is configured to determine whether client system 10 comprises malicious software. In some embodiments, engine 56 may further remove or otherwise incapacitate malware. To perform malware detection, engine 56 may employ any method known in the art. Anti-malware methods generally fall under two broad categories: content-based and behavioral. Content-based methods typically scan the code of a software entity for malware-indicative patterns, commonly known as signatures. Behavioral methods typically monitor an executing entity to detect certain malware-indicative actions performed by the respective entity. A software entity is considered malicious if it is configured to perform any of a set of malicious operations, for instance operations conducive to a loss of privacy, a loss of personal or sensitive data, or a loss of productivity on the part of a user. Some examples include modifying, erasing, or encrypting data without the knowledge or authorization of a user, and altering the execution of legitimate programs executing on client system 10. Other examples of malicious operations include extracting a user's personal or sensitive data, such as passwords, login details, credit card or bank account data, or confidential documents, among others. Other examples of malicious actions include an unauthorized interception or otherwise eavesdropping on a user's conversations and/or data exchanges with third parties. Other examples include employing client system 10 to send unsolicited communication (spam, advertisements), and employing client system 10 to send malicious data requests to a remote computer system, as in a denial-of-service attack.

In some embodiments, engine 56 monitors and/or analyzes a set of executable entities residing and/or in execution on client system 10. Exemplary executable entities include applications, processes, and executable modules, among others. An executable module is a component or a building block of a process, the respective component comprising executable code. Executable modules may be loaded and/or unloaded to/from memory during the launch and/or execution of the respective process. Exemplary executable modules include a main executable of a process (such as an EXE file in Windows®), and a shared library (such as a dynamic-linked library—DLL), among others. In some embodiments, the main executable module of a process comprises the first machine instruction executed when the respective process is launched. Libraries are self-contained sections of code implementing various functional aspects of a program. Shared libraries may be used independently by more than one program. Other examples of executable entities include, among others, executable scripts called by the respective process (e.g., Perl, Visual Basic®, JavaScript® and Python scripts), interpreted files (e.g. Java® JAR files), and pieces of code injected into the respective process by other entities. Code injection is a generic term used in the art to indicate a family of methods for introducing a sequence of code into the memory space of another entity to alter the original functionality of the respective entity. A person skilled in the art will appreciate that the systems and methods described here may be translated to other kinds of executable modules.

In some embodiments, reputation manager 58 is configured to determine reputation data for a variety of executable entities (software objects) including applications, processes, and libraries, to store and/or retrieve such data to/from reputation databases, and to transmit such data to anti-malware engine 56. In some embodiments, reputation manager 58 comprises an entity manager 62, an activity monitor 64, a fingerprint calculator 66, and a reputation update scheduler 68. The operation of these components will be further described below. In an alternative embodiment to the one illustrated in FIG. 6, entity manager 62 and activity monitor 64 may be part of anti-malware engine 56.

In some embodiments, a client reputation database 16c communicatively coupled to reputation manager 58 is configured to temporarily store reputation data on computer-readable media of the respective client system. A client reputation server 14c comprises a computer program executing on client system 10, server 14c configured to selectively add and/or retrieve reputation data to client reputation database 16c. Database 16c forms a part of the database hierarchy described above, and may function, at least in part, as a cache of local and/or central reputation databases 16a-b. In the exemplary configuration shown in FIG. 6, reputation manager 58 employs a communication manager 69 to exchange data with remote servers 14a-b.

Figure 7:
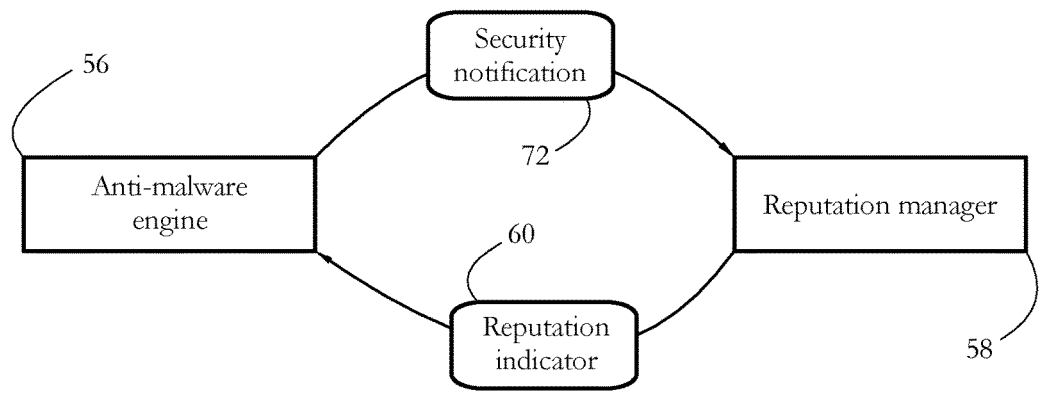
FIG. 7 illustrates an exemplary data exchange between a reputation manager component and an anti-malware engine component of the security application, according to some embodiments of the present invention.

FIG. 7 shows an exemplary data exchange between manager 58 and engine 56. Reputation manager 58 cooperates with anti-malware engine 56 to increase the efficiency of anti-malware operations, for instance by communicating a reputation indicator 60 associated with a target entity to engine 56. In some embodiments, reputation indicator 60 is indicative of a probability that the respective executable entity is malicious. Exemplary reputation indicators 60 include a numerical reputation score ranging from a minimum value (e.g., 0) to a maximum value (e.g., 100). In one exemplary embodiment, a high reputation score indicates a high probability that the respective entity is benign (not malicious), while low scores indicate a suspicion of malice or an unknown/currently indeterminate probability of malice. Other embodiments may use a reversed scale wherein a low score indicates a higher degree of trust than a high score. Reputation indicators may vary continuously between the minimum and the maximum, or may jump among a set of pre-determined discrete plateaus (e.g., 10, 25, 50, 100). In another embodiment, reputation indicator 60 may take values from a plurality of labels, for instance "trusted", "moderately trusted", "untrusted", and "unknown".

In response to receiving reputation indicator 60, some embodiments of anti-malware engine 56 give preferential treatment to trusted entities, as opposed to untrusted or unknown entities. For instance, engine 56 may use a relaxed security protocol to scan/monitor a trusted object, and a strict security protocol to scan/monitor an unknown or an untrusted object, wherein the relaxed security protocol is less computationally expensive than the strict security protocol. In one such example, a relaxed security protocol may instruct engine 56 to employ only a subset of malware detection methods and/or only a subset of malware-identifying heuristics to scan a trusted object, whereas a strict security protocol may use a full set of methods and/or heuristics available to engine 56. Computational cost may be generally formulated according to a count of processor clock cycles and/or a memory required to execute a particular procedure. Procedures/protocols requiring more clock cycles and/or more memory may thus be considered more computationally expensive than procedures/protocols requiring fewer clock cycles and/or less memory.

In some embodiments, reputation indicator 60 varies in time, for instance in response to various actions performed by the respective executable entity. In one example wherein high reputations indicate trust, the reputation of a target entity increases in time, provided that the respective entity does not perform any malware-indicative actions. The respective reputation may also decrease in response to certain actions of the target entity. In some embodiments, the reputation of a target entity may change in response to actions of other entities related to the respective target entity, for instance in response to receiving an injection of code from another entity, in response to a malware-indicative action performed by a child entity of the respective entity, etc. Reputation manager 58 may receive security notifications about various actions of target entities from anti-malware engine 56, as illustrated in FIG. 7.

Figure 8:
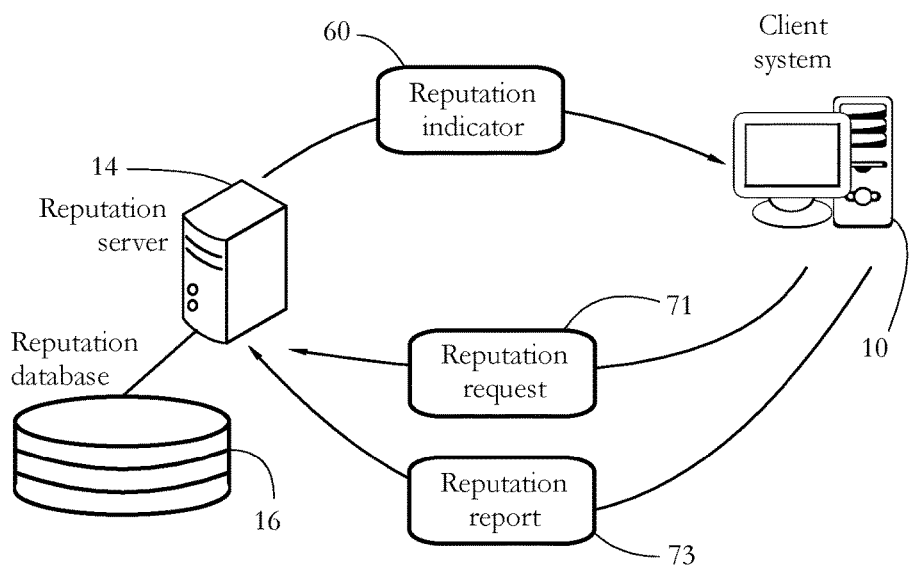
FIG. 8 illustrates an exemplary data exchange between a client system and a reputation server according to some embodiments of the present invention.

In some embodiments, reputation manager 58 looks up the reputation indicator of a target entity in a hierarchy of reputation databases. To minimize communication delays and data traffic, reputation manager 58 may first attempt to retrieve reputation data from client database 16c. When it cannot find matching data in client database 16c, manager 58 may then query local database 16b. Then, when the sought-after data is still not found, manager 58 may proceed to request it from remote, central reputation database 16a. FIG. 8 illustrates data exchanges between client system 10 and a remote reputation server 14 (generically representing servers 14a-b-c in FIGS. 1, 2, and 6 respectively). In some embodiments, such communication between clients and remote reputation servers is encrypted to avoid man-in-the-middle attacks. Client system 10 may transmit a reputation request 71 to server 14, request 71 indicating an identification token such as an entity fingerprint of a target entity. In response, server 14 may selectively retrieve reputation indicator 60 corresponding to the respective target entity from database 16 (generically representing databases 16a and/or 16b in FIGS. 1 and 2, respectively), and transmit indicator 60 to client system 10. Client system 10 may also transmit a reputation report 73 to server 14, report 73 indicating an updated reputation indicator intended for storage in database 16.

To allow an unambiguous association between executable entities and reputation indicators, each executable entity is identified by way of a unique token herein called entity fingerprint. In some embodiments, fingerprint calculator 66 is configured to compute such fingerprints for target entities and executable modules. Fingerprints may be generated using any method known in the art, for instance via hashing. Hashing comprises applying a hash function to a part of an object (e.g., to a section of code or to the whole object) to obtain a fixed-size number or bit string known as a hash of the respective object. Exemplary hash functions include secure hash (SHA) and message digest (MD) algorithms.

In a preferred embodiment, an entity fingerprint 70 is determined according to a set of fingerprints of individual components/building blocks of the respective entity. In the example shown in FIG. 9, an executable entity 80 comprises a set of executable modules 82a-c. For instance, in a Windows® environment, modules 82a-c may comprise a main executable and two DLLs, respectively. In other exemplary embodiments, modules 82a-c may represent other entity components (e.g., scripts, JAR files, injected pieces of code, etc.). A person skilled in the art will appreciate that the systems and methods described here may be translated to other kinds of building blocks and other levels of granularity.

In some embodiments, a module fingerprint 74a-c (e.g., a hash) is computed for each of the components of executable entity 80. Fingerprint calculator 66 may then determine entity fingerprint 70 as a combination of module fingerprints 74a-c, for instance by arranging module fingerprints 74a-c as an ordered list and/or by concatenating module fingerprints 74a-c. To facilitate fingerprint comparison and lookup, some embodiments may apply a second hash function to the concatenation/list of module fingerprints 74a-c. In some embodiments, entity fingerprint 70 further comprises a list of path indicators, each path indicator indicating a path or location of a corresponding component/module. When the respective component is a piece of injected code, entity fingerprint 70 may encode a memory address and/or a size of the respective piece.

Each entity fingerprint 70 configured as above uniquely represents a particular composition or arrangement of components/building blocks, rather than the executable entity itself as seen, for instance, by operating system 46. Typically, the operating system assigns each executable entity a unique identifier (e.g., a process ID), which remains unchanged during the whole lifetime of the respective entity, even in cases where the composition of the respective entity changes during the entity's lifetime. In contrast, in some embodiments of the present invention, when the composition of an executable entity changes (e.g., when a process dynamically loads and unloads libraries), entity fingerprint 70 and therefore the identity of the respective entity may change accordingly. Stated otherwise, in some embodiments, when the composition of an entity changes, the original entity ceases to exist and a new entity is created. Since some embodiments uniquely associate a reputation indicator with each entity fingerprint, when the composition of an executable entity changes, its reputation may change as well.

Figure 9:
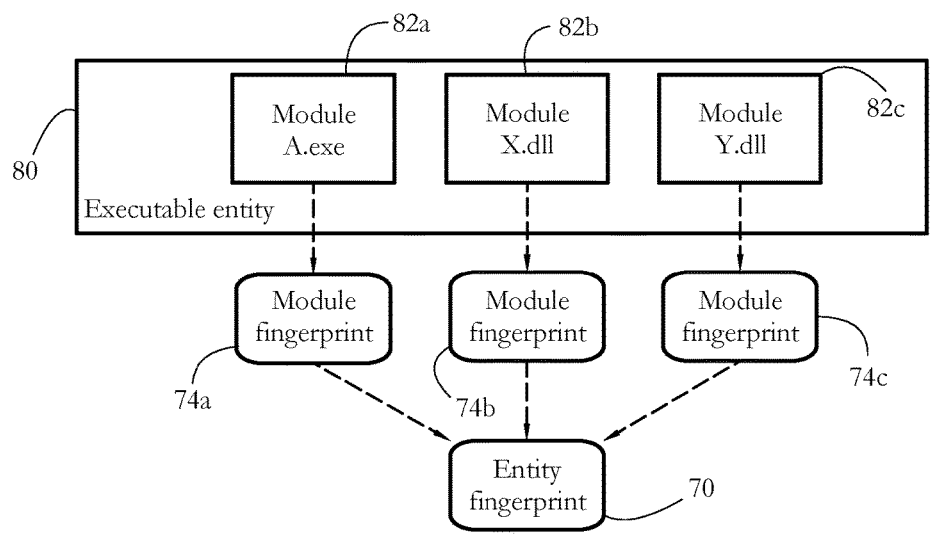
FIG. 9 shows exemplary components of a fingerprint of an executable entity according to some embodiments of the present invention.
Figure 10:
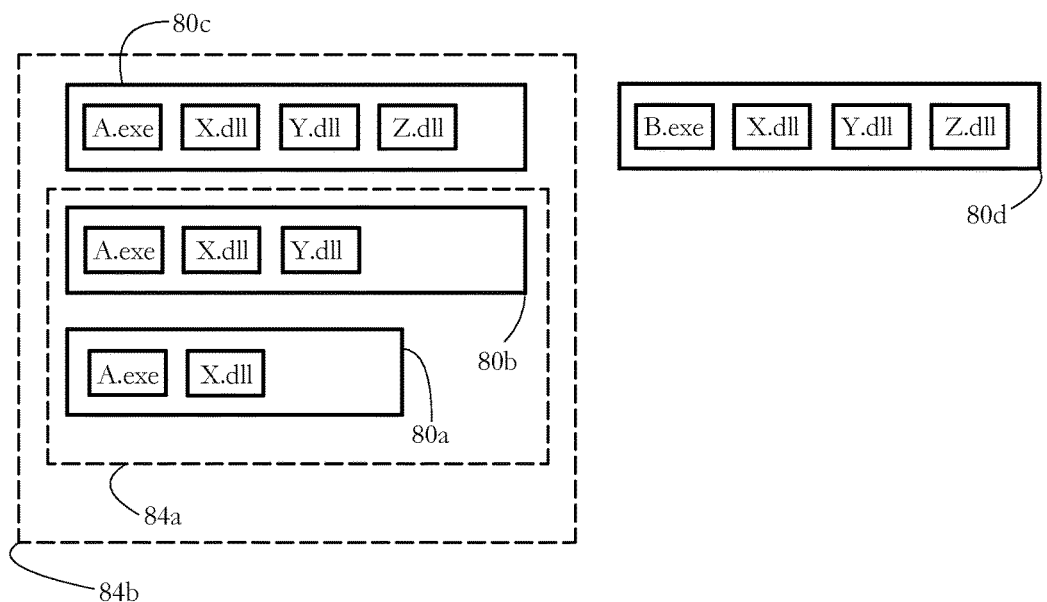
FIG. 10 illustrates exemplary sets and supersets of executable entities according to some embodiments of the present invention.

A particular combination of components/building blocks may appear in multiple executable entities, as shown in FIG. 10. An entity Y having all components of another entity X is herein said to be a member of an entity superset of entity X In the example of FIG. 9, set 84a is an entity superset of entity 80a, while set 84b is an entity superset of both entities 80a and 80b. In contrast, entity 80d is not a member of an entity superset of either entities 80a-c, since entity 80d does not contain module A.exe. In some embodiments, the reputation of an entity may affect the reputation of members of an entity superset of the respective entity, and in turn may be affected by the reputation of said members, as shown in detail below. In the example of FIG. 9, a change in the reputation of entity 80a may cause changes in the reputation of entities 80b-c.

In some embodiments, entity manager 62 (FIG. 6) maintains a data structure herein called reputation table, describing a plurality of executable entities residing and/or executing on client system 10, as well as a set of relationships between such entities. An exemplary reputation table comprises a plurality of entries, each entry corresponding to an executable entity. One such reputation table entry 86 is illustrated in FIG. 11. Entry 86 comprises an entity fingerprint 70 of the respective entity and an entity ID (EID) assigned to the respective executable entity by operating system 46. When the respective entity is a process, an exemplary EID comprises the process ID—PID in Windows®. Such a configuration may be desirable because it allows an immediate association between fingerprint 70 and the EID. Since the composition of an entity may change in time (for instance by dynamically loading a library), there may be multiple reputation table entries having the same EID but distinct fingerprints. Furthermore, there may be multiple instances of the same entity executing concurrently on client system 10, thus there may be multiple reputation table entries having the same fingerprint but distinct EIDs. In principle, each such object may have its own behavior and reputation and therefore may be monitored/analyzed distinctly from other objects.

In some embodiments, entry 86 may further store a filiation indicator of the respective entity, for instance an identifier of a parent entity of the respective entity (parent ID—PID) and/or an identifier of a child entity of the respective entity. Exemplary child entities are child processes, for instance created by a parent entity via the CreateProcess function of the Windows® OS, or via the fork mechanism in Linux®. Entry 68 may also include a set of identifiers of executable entities which have injected code into the respective entity, and/or a set of identifiers of entities into which the respective entity has injected code. These identifiers, which may be entity fingerprints, are represented by an injected entity ID—INJID.

Reputation table entry 68 may further include a set of identifiers of members of an entity superset of the current entity (superset member ID—SMID). In some embodiments, each SMID may consist of an entity fingerprint of the respective superset member. In an alternative embodiment, each SMID may comprise a pointer to the reputation table entry associated with the respective entity superset member. Associating fingerprint 70 with a PID, SMID, and/or INJID may facilitate the propagation of reputation information between parent and children entities, between entities and superset members, and between entities which participate in code injection, as shown in more detail below.

The current reputation of a target entity may vary in time, according to the behavior of the respective entity and/or according to the behavior of other instances of the respective entity. In some embodiments, when the target entity does not carry out any suspect or malware-indicative actions, the reputation of the respective entity may increase in time, for instance according to a pre-determined schedule. Reputation update scheduler 68 (FIG. 6) may be configured to schedule reputation updates for target entities, for instance by determining a moment in time when the next update of the reputation indicator should take place, and an increment ΔR by which the current reputation indicator should change.

Temporal data may be stored (e.g., as a timestamp) in a set of fields of reputation table entry 86; see, e.g., time indicators 88 in FIG. 11. One such time indicator may indicate a time of the latest update of the reputation indicator corresponding to the respective entity fingerprint. Another time indicator may indicate a time for the next scheduled update of the respective reputation indicator. A plurality of such reputation update times may thus chronicle in detail the reputation dynamics of each target entity. Another exemplary time indicator may indicate an expiration time of a historical reputation of the respective entity, e.g., the moment when the next database lookup for the historical reputation is due. Historical reputation lifetimes may vary among executable entities. By specifying a limited lifetime for cache reputation data, some embodiments effectively force a refresh of reputation data from local or remote reputation servers 14, thus containing a potential infection.

In some embodiments, activity monitor 64 (FIG. 6) is configured to detect the occurrence of life-cycle events of entities such as applications and processes executing within client system 10. Exemplary life-cycle events include the launch and/or termination of an executable entity, dynamic loading and/or unloading of libraries by the respective entity, the spawning of child entities, and code injection, among others.

Activity monitor 64 may further determine inter-object relationships, such as which process loaded which executable module, which entity is a parent or a child of which entity, which entity has injected or received injected code from which entity, etc. In some embodiments, activity monitor 64 collaborates with entity manager 62 to populate reputation table entry 68 of each entity with the required data (e.g., EID, PID, SMID, INJID etc.). To perform tasks such as detecting the launch of an entity and/or detecting code injection, monitor 64 may employ any method known in the art, such as calling or hooking certain OS functions. For instance, in a system running a Windows® OS, monitor 64 may intercept a call to a LoadLibrary function or to a CreateFileMapping function to detect the loading of an executable module. In another example, monitor 64 may register a PsSetCreateProcessNotifyRoutine callback to detect the launch of a new process, and/or may hook the CreateRemoteThread function to detect execution of injected code.

FIG. 12-A shows an exemplary sequence of steps performed by reputation manager 58 in some embodiments of the present invention. A sequence of steps 302-304 may wait for a notification. In some embodiments, reputation manager 58 is notified by activity monitor 64 about the occurrence of an entity life-cycle event, such as a launch of a process, loading of a DLL, etc. Manager 58 may be also notified by scheduler 68 that a certain reputation table entry is due for update. Manager 58 may further receive notifications from anti-malware engine 56 when a target entity performs certain actions which may be relevant to computer security (see FIG. 7). When a notification is received, step 304 may identify a source and/or type of the respective notification, and may further identify target entities causing the respective notification and/or entities being affected by the respective notification. In some embodiments, entity monitor 64 may determine the identity of such entities from data structures used by OS 46 to represent each entity currently in execution. For instance, in Windows, each process is represented as an executive process block (EPROCESS), which comprises, among others, handles to each of the threads of the respective process, and a unique process ID allowing OS 46 to identify the respective process from a plurality of executing processes. Similar process representations are available in Linux® and in other operating systems. When more than one entity is affected by the notification, step 304 may further include determining a relationship between the respective entities. For instance, when a parent process launches a child process, entity monitor 64 may record the identity of child and parent, and the type of their relationship (filiation).

FIG. 12-B shows an exemplary sequence of steps carried out by reputation manager 58 in response to receiving a notification from activity monitor 64. Such notifications typically communicate the occurrence of a life-cycle event concerning a target entity. In a step 322, fingerprint calculator 66 may compute an entity fingerprint of the respective target entity. Step 322 may comprise listing modules/building blocks of the target entity, identifying a memory section holding each such module, computing module fingerprints, and assembling the entity fingerprint according to individual module fingerprints (see FIG. 9 and associated description). In a step 323, entity manager 62 may look up the entity ID (EID) of the target entity in the reputation table, to determine whether an object with the same EID is already being tracked/analyzed. The entity ID is used by the operating system to identify the target entity; in a Windows® environment, an exemplary EID is the process ID (PID) of a process currently in execution. When the respective EID is new (indicating that the target entity is a new instance of an executable object), in a step 325, entity manager 62 may create a new reputation table entity to represent the target entity. When the respective EID is not new (for instance when the module composition of the target entity is changing, e.g. a process is loading a library), a step 324 may determine whether the reputation table currently lists an entity with the same fingerprint 70 as the target entity. When the reputation table already contains an entry with the same fingerprint, reputation manager 58 may advance to a step 326 described below. Such situations may arise, for instance, when the detected lifecycle event refers to an already executing target entity. When the fingerprint of the target entity is new (no entity with the same fingerprint is listed in the reputation table), entity manager 62 may create a new table entry for the respective target entity.

In some embodiments, a change in the module composition of an entity causes a change in the entity fingerprint. Therefore, although the respective entity has not been terminated, from the perspective of fingerprints it may appear as if the old entity has ceased to exist, and a new entity has appeared on client system 10. In such cases, as well as in cases when a new entity has been launched, in a step 336 reputation manager 58 may attempt to look up historical reputation data associated with the respective entity fingerprint. Step 336 may comprise, for instance, reputation manager 58 sending reputation request 71 to reputation server 14 (see e.g., FIG. 8). When historical reputation data does exist for the respective fingerprint, server 14 may selectively retrieve such data from database 16 and transmit indicator 60 to client system 10. Such a situation may arise when an instance of the respective entity (combination of executable modules) has been observed before, possibly executing on a distinct client system, and a reputation of the respective entity has been computed and stored in database 16. Upon receiving reputation indicator 60, in a step 338, reputation manager 58 may set the current reputation indicator of the target entity to a value determined according to the historical reputation of the respective entity. In one exemplary embodiment, the current reputation is set to be equal to the historical reputation.

When step 337 determines that no historical reputation is available for the target entity, reputation manager advances to a step 339. This situation may arise, for instance, when new software appears on the market (e.g., a new product or a software update), when a database entry for the respective entity has expired, or when server 14 is not available (e.g., lack of network connection, server down). In step 339, entity manager 64 may determine whether the target entity is a child entity of a parent entity currently listed in the reputation table. When yes, in a step 340 some embodiments set the reputation of the target entity to a value determined according to a reputation of the parent entity (e.g. equal to or lower than the parent's reputation).

In a step 341, entity manager 64 may determine whether there are any members of an entity superset of the target entity currently present in the reputation table. When yes, some embodiments of reputation manager 58 set the current reputation of the target entity to a value determined according to a reputation of the superset member entity (e.g. equal to the superset member's reputation). A reasoning supporting such a choice of reputation considers that since superset members comprise a substantial majority (or all) of executable modules of the target entity, the reputation of the target entity may be deduced from the reputation of a superset member.

When there are no parent entities or superset member entities, in a step 344 reputation manager 58 may set the current reputation of the target entity to a pre-determined, default value. For instance, the reputation of an unknown entity may be set to a value indicative of a low degree of trust (e.g., untrusted, unknown, R=0). The initial reputation may also depend on a type of the target entity, or on a set of features of the target entity. For instance, an entity downloaded from the Internet may receive an initial reputation value R=0 if it is not digitally signed, and an initial reputation value R=20% when it is signed.

Figure 13:
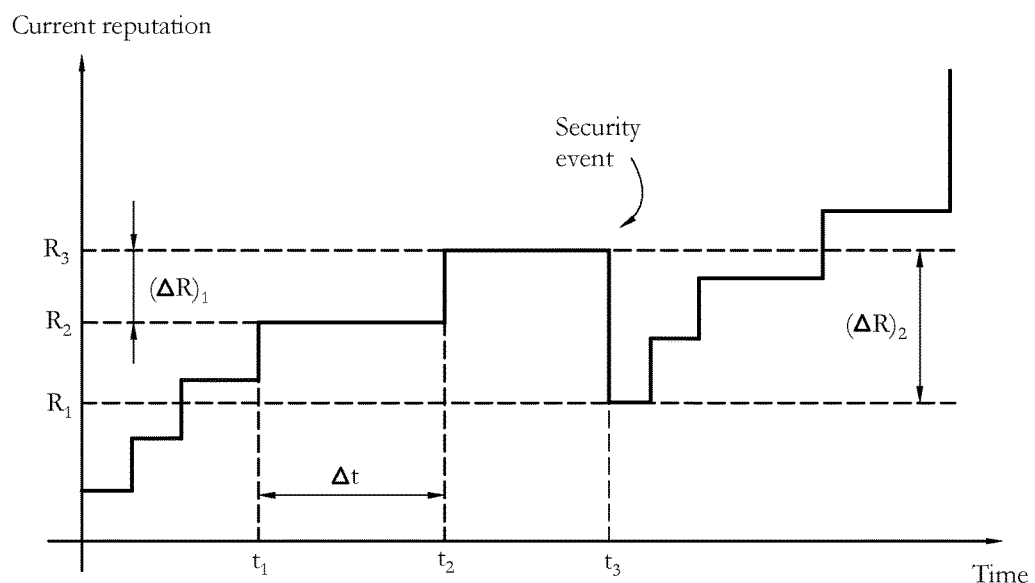
FIG. 13 illustrates an exemplary temporal evolution of a reputation indicator according to some embodiments of the present invention.

In a step 326, update scheduler 68 may schedule a next update of the target entity's reputation table entry. In some embodiments, the reputation of a target entity varies in time. For instance, when the respective entity does not perform any action deemed suspect or malware-indicative, and/or when the target entity does not comprise any code pattern matching a malware-indicative signature, the reputation indicator of the respective entity may progress towards values indicating a higher level of trust (e.g., R may increase toward 100% trust). An exemplary variation scenario for the reputation indicator in an embodiment wherein higher R values indicate more trust is shown in FIG. 13. The illustrated reputation indicator may jump between a set of predetermined values $R_1$, $R_2$, $R_3$, etc. Such changes in reputation may occur at pre-determined moments, for instance R may increase from value $R_2$ to value $R_3$ at a time instance $t_2$ (e.g., measured with respect to the moment of creation of the respective target entity).

The value R may be determined according to a time elapsed since the creation/launch of the respective target entity. In an alternative embodiment, R may increase after a time interval $\Delta t$ has elapsed since the occurrence of a previous event (e.g., a previous increase in reputation, a security event, etc.). In some embodiments, time intervals $\Delta t$ may themselves vary in time. For example, reputation increases may be less frequent in the early life of an entity than at a later stage. In another example, the length of the time interval may depend on the current value of the reputation. Reputation increments may be proportional to a current reputation value (e.g., each time, R may increase by 20%). Reputation increments $\Delta R$ may also vary in time. For instance, R may increase by small amounts in the early life of an entity and by larger amounts at later times. A rationale supporting such reputation dynamics is that malicious software typically performs its activity in the early stages of existence (i.e., soon after launch), so when an entity behaves well for a long enough time, it may be safe to assume it is not malicious.

In some embodiments, time intervals $\Delta t$ and/or reputation increments $\Delta R$ may be entity-type-specific, in the sense that they may vary according to a type of the respective target entity. For instance, the reputation dynamics of an entities which is digitally signed may differ from the reputation dynamics of an entity that is not. In another example, the reputation dynamics of an entity may differ according to whether the respective entity is configured to access the Internet or not.

In some embodiments, scheduling a reputation update (step 326 in FIG. 12-B) comprises determining a time interval for the next update and/or a reputation increase. A step 328 then updates a reputation table entry of the respective entity accordingly. Changes in the current reputation of a target entity may trigger changes in current reputation of other entities, for instance a parent entity of the target entity or an entry of a superset member of the target entity. When so, in a step 330, reputation manager 58 carries out such updates. In a sequence of steps 332-334, reputation manager 58 transmits reputation indicator 60 to anti-malware engine 56 and to reputation server 14.

FIG. 12-C shows an exemplary sequence of steps executed by reputation manager 58 in response to a notification from update scheduler 68 (label B in FIG. 12-A). Such a notification typically identifies a target entity, and indicates that the reputation indicator of the respective target entity is due for an update. In a step 356, reputation manager 58 may update the reputation indicator of the respective entity, for instance according to a reputation increment stored in a field of the reputation table entry of the respective entity (see, e.g., FIG. 11). In a step 358, reputation update scheduler 68 may schedule the next reputation update, for instance by determining a time interval $\Delta t$ and a reputation increment $\Delta R$, and writing these values to the corresponding fields of the reputation table entry of the respective target entity (step 360). Reputation increment $\Delta R$ may be determined as an absolute value or as a fraction of the current reputation (e.g., 20%). A sequence of steps 360-364 updates table entries of other entities related to the target entity, and transmits reputation indicator 60 to anti-malware engine 56.

In a further step 366, reputation manager 58 may trigger an update of reputation database 16 to reflect the change of reputation of the target entity and possibly of other related entities. Step 366 may comprise sending reputation report 73 comprising the updated reputation indicators to reputation server 14 (e.g., FIG. 8). Such updating makes the new reputations available to other client systems running other instances the same target entity, thus propagating computer security knowledge throughout the network of clients. For an exemplary manner in which reputation server 14 handles report 73, see below in relation to FIG. 15.

FIG. 12-D shows an exemplary sequence of steps performed by reputation manager 58 in response to a security notification from anti-malware engine 56 (see e.g., FIG. 7). Such notifications may be generated when anti-malware engine determines that a particular target entity is suspected of malice. In some embodiments, engine 56 may notify reputation manager 58 about the occurrence of an event relevant for security, or of an event which is malware-indicative. Exemplary events comprise, among others, an attempt to access memory in a manner which violates a memory access permission, an attempt to execute certain function of the operating system (e.g., creating a disk file, editing a registry entry, etc.), an attempt to perform certain operations (e.g., to inject code into another entity, to download a file from a remote server). Notification 72 may comprise an identifier of an entity that caused or that is affected by the respective event, and an indicator of a type of the respective event. Another example of notification may be generated in response to a signature scanner finding a malicious code signature while parsing the code of a target entity.

In response to receiving security notification 72, in a step 372 reputation manager 58 may determine a new value for the reputation indicator of the respective target entity. In some embodiments, when an entity performs an action which is malware indicative or which otherwise renders the respective entity suspect of malice, the reputation of the respective entity changes in the direction of lower trustworthiness. This aspect is illustrated in FIG. 13, wherein the value of R drops in response to a security event. The magnitude of the drop may be determined by reputation manager 58 according to a set of rules/security policy. The magnitude of the drop may be expressed as an absolute value or as a fraction of a current reputation value (e.g., 50%).

In some embodiments, the size of the drop in reputation occurring on such an occasion varies according to a type of event or to a type of security notification. Some events/actions are more clearly malware-indicative and therefore may trigger larger drops in reputation. Other events are not necessarily indicative of malice, but may be so when occurring alongside other events or alongside certain actions performed by the target entity. The change in reputation triggered by such events or actions may be relatively smaller than the one associated with a clearly malicious event/action. Some security notifications may cause a total loss of reputation for the respective target entity. In some embodiments, the drop in reputation may be determined according to whether the respective reputation indicator has suffered other drops in the past, according to a time elapsed since the previous drop in reputation, and/or according to a type of security notification that triggered the previous drop in reputation. Some malware agents orchestrate malicious actions across a plurality of entities and spread such actions in time so as to avoid detection. Conditioning a current drop in reputation on a previous history of security notifications may address some such sophisticated malware scenarios. In some embodiments, the change in reputation occurring in step 372 is computed according to a current reputation of the target entity and/or according to a current reputation of other entities. In one such example, when an entity X injects code into an entity Y, the reputation of the more trustworthy of the two entities may become equal to the current reputation of the less trustworthy one.

In a step 374, reputation manager 58 may schedule an update of the reputation of the respective target entity, for instance by generating a time interval $\Delta t$ and a reputation increment $\Delta R$. A further step 376 may save such data to the reputation table entry of the respective entity. In some embodiments, the values of $\Delta t$ and/or $\Delta R$ may vary according to a type of security notification. In one such example, when an entity has performed an action which is clearly indicative of malice, it may remain untrusted for a relatively long period of time. In contrast, after a drop caused by a less security-critical event, the reputation of a target entity may increase again relatively fast.

In some embodiments, a sequence of steps 376-380-382 may update reputation table entries of other entities related to the target entity (if existing), may transmit reputation indicator 60 to anti-malware engine 56, and may report changes in reputation to server 14.

Figure 14:
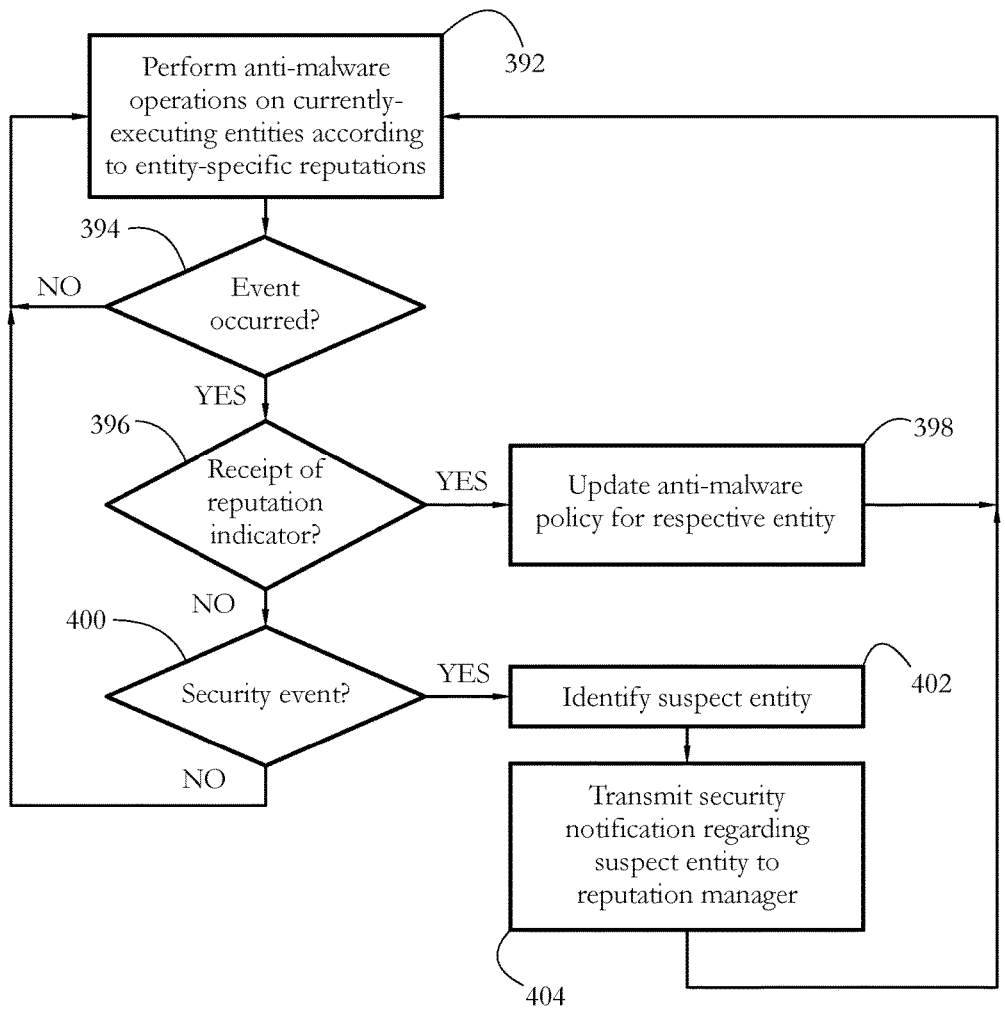
FIG. 14 shows an exemplary sequence of steps performed by the anti-malware engine component of the security application according to some embodiments of the present invention.

FIG. 14 shows an exemplary sequence of steps carried out by anti-malware engine 56 according to some embodiments of the present invention. Engine 56 may be configured to carry out malware detection, prevention, and/or cleanup activities according to entity-specific reputations (step 392). Stated otherwise, anti-malware engine 56 may monitor and/or analyze each executable entity according to an entity-specific protocol/policy, wherein the respective policy/protocol may vary from one entity to another according to a reputation indicator of each entity. In some embodiments, entities having a reputation that indicates a high trustworthiness may be analyzed using less computationally-expensive procedures than entities which are less trustworthy.

Behavioral malware detection typically uses a set of rules to determine whether a target entity is malicious. Such rules are often referred to as heuristics. One exemplary heuristic may say, for instance, that if a first entity injects a piece of code into a second entity, and the respective code attempts to download a file from the Internet, then the first entity is probably malicious. To implement such heuristics, anti-malware engine 56 may need to monitor a variety of events (e.g., code injection and an attempt to connect to a remote serve, in the above example). Some such events are more computationally costly to monitor than others. Furthermore, some heuristics may be intrinsically more complex and/or more difficult to apply than others. Complex heuristics may include a combination of simpler heuristics, e.g. "apply method A; if outcome of A is X, apply method B; if outcome of B is Y, further check condition Z, etc."

Some examples of expensive heuristics include heuristics used to detect ransomware (comprising monitoring all file system activity—every file read, write, and/or copy) and heuristics concerning OS registry keys (e.g., comprising intercepting every write to the registry and determining whether it comprises an attempt to modify a particular key). Another example of an expensive heuristic requires detecting a call to a frequently used OS function (e.g., CreateFile, ReadFile)—detecting such calls may result in substantial overhead. In contrast, detecting a call to an OS function which is used very sparingly in regular operation (e.g., CreateRemoteThread) may place a much lower burden on client system 10.

In some embodiments, obtaining a reputation-dependent detection protocol comprises varying event monitoring and/or the complexity of heuristics according to a reputation indicator. Stated otherwise, anti-malware engine 56 may monitor a trusted entity using fewer and relatively simpler heuristics than an untrusted entity. Engine 56 may also disable detection of certain events or behaviors when monitoring trusted entities. Content-based anti-malware methods may also be made reputation-specific, for instance by adjusting the size of a signature database according to reputation. In one such example, trusted entities may be checked for the presence of a relatively small set of malware-indicative signatures, while untrusted entities may be checked using a substantially larger signature set.

One example of adjusting monitoring protocol with the reputation indicator is shown in Table 1.

TABLE 1

| Reputation indicator | Protocol |
| --- | --- |
| 0% trusted | Maximum monitoring, employ all available heuristics |
| 10% trusted | Disable a few expensive heuristics |
| ... | |
| 80% trusted | Monitor for code injection and drop/copy files |
| 90% trusted | Only monitor for code injection |
| 100% trusted | No monitoring at all |

Returning to FIG. 14, in a sequence of steps 392-394, anti-malware engine 56 is configured to wait for the occurrence of an event as described in a reputation-specific protocol. Beside such security-relevant events, engine 56 may receive reputations indicators from reputation manager 58. Receiving a reputation indicator may indicate that the reputation of a particular entity has changed. In response to receiving a reputation indicator (step 396), in a step 398 anti-malware engine may identify the respective target entity and update the monitoring protocol/policy that applies to the respective entity according to the received value of the reputation indicator.

When the detected event comprises a security event (e.g., an entity has injected code into another entity), in a step 402 anti-malware engine 56 may identify a target entity that caused the respective event and/or that was affected by the respective event. A further step 404 may formulate a security notification according to the identity of the target entity and to a type of the detected event, and transmit the respective security notification to reputation manager 58.

Figure 15:
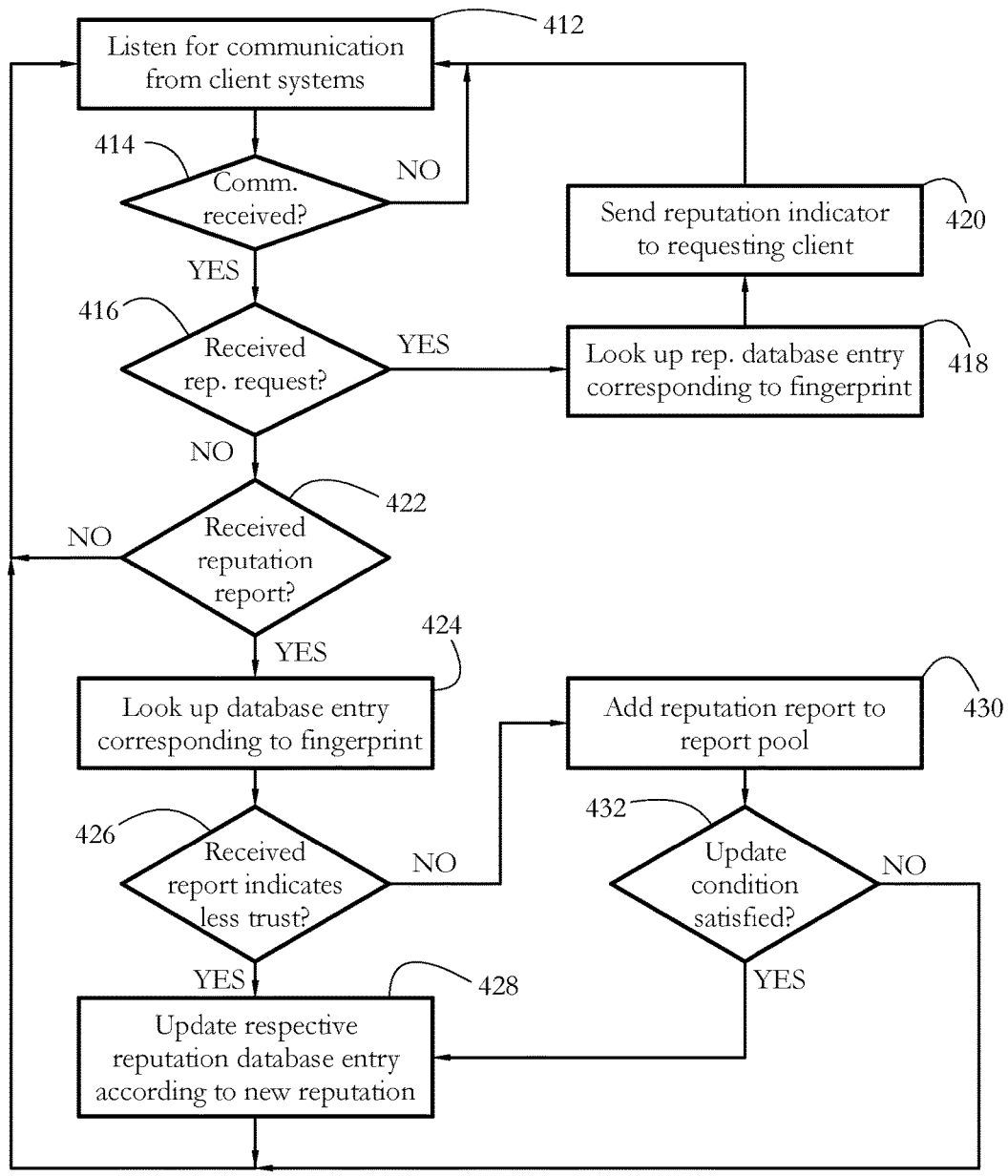
FIG. 15 shows an exemplary sequence of steps performed by a reputation server according to some embodiments of the present invention.

FIG. 15 shows an exemplary sequence of steps carried out by reputation server 14 (e.g., servers 14a-b in FIGS. 1-2) according to some embodiments of the present invention. In a sequence of steps 412-414, server 14 may listen for communication from client systems 10. When a communication is received, a step 416 may determine whether the respective communication is a reputation request (see, e.g., FIG. 8). When yes, server 14 may look up historical reputation data associated with entity fingerprint included in the respective request, and transmit the data to the requesting client (steps 418-420).

When the communication comprises a reputation report, in a step 424, server 14 may look up reputation data associated with the entity fingerprint included in the respective reputation report. When report 73 indicates a current reputation value which indicates less trust than the historical reputation stored in database 16, in a step 428 some embodiments of reputation server 14 may immediately change the respective database entry to include the value of the reputation indicator received in the report from client 10.

When report 73 comprises a reputation indicator indicative of more trust than the currently stored value, in some embodiments a step 430 may add reputation report 73 to a collection of reports received from various clients. In a step 432, reputation server 14 may then determine whether an update condition is satisfied, and update the database entry only when the update condition is satisfied. The update condition may be formulated according to a time constraint and/or according to a count of reports received for each individual entity fingerprint. For instance, an update may happen only after a certain time interval has elapsed since the latest update of the reputation indicator corresponding to the respective entity fingerprint. In another example, the update may happen only after a certain time interval has elapsed since the latest security notification regarding the respective target entity. In one exemplary embodiment wherein high reputation equates to more trust, when the update condition is satisfied, the historical reputation of a target entity is updated to a value equal to the minimum of all reputations reported for the respective target entity during the latest update period.

The exemplary systems and methods described above allow protecting a client system such as a personal computer, tablet, or smartphone, from malicious software. In some embodiments, a reputation manager executes concurrently with an anti-malware engine. The anti-malware engine performs operations such as detecting malware executing on the respective client system and/or removing or incapacitating such malware. For each entity (e.g., application, process, script) executing on the client system, the reputation manager may transmit a reputation indicator to the anti-malware engine, the reputation indicator indicative of a level of trust that the respective entity is not malicious.

In conventional security systems, software entities are scanned and/or monitored regardless of their reputation. In contrast, in some embodiments of the present invention, the anti-malware engine may give preferential treatment to trusted entities. For instance, the anti-malware engine may use a less computationally expensive protocol (e.g., requiring more processor clock cycles and/or more memory) to scan/monitor a trusted entity, compared to an untrusted or unknown/previously unseen entity. In one such example, a subset of rules may be disabled when scanning/monitoring trusted entities. This approach may substantially improve anti-malware performance, by reducing the computational burden associated with scanning/monitoring trusted entities.

In some embodiments of the present invention, each executable entity is seen as a unique combination of components/building blocks. Examples of such building blocks include, among others, a main executable, a shared library, a script, and a section of injected code. Each combination of components may be identified via an entity fingerprint comprising, for instance, a combination of hashes of individual components. A reputation indicator may then be associated with each entity fingerprint. When the composition of an entity changes (e.g., when a process dynamically loads a library or receives a piece of injected code), its fingerprint changes and so does its reputation.

In some embodiments, the reputation of an entity changes in time. While an entity does not perform any suspect or malware-indicative actions, its reputation may shift towards values indicative of more trust. In contrast, when an entity performs malware-indicative or otherwise security-relevant action, its reputation may be downgraded towards values indicating less trust. Such changes in reputation may be saved in a local cache and/or transmitted to a central reputation database. Such configurations allow any change in reputation to propagate swiftly to other local processes using instances of the respective shared library, and further to other client systems connected to the reputation server.

In some embodiments, a drop in reputation (which may indicate a suspicion of malice) propagates relatively fast to reputation databases and from there to other client systems, while increases in reputation (which may indicate an increase in trust) may take effect only after enough time has elapsed without security incidents, or after the respective entity has been reported as well-behaved by a sufficient number of client systems.

Systems and methods described herein may readily apply to a broad variety of malicious software, including emerging threats. Furthermore, since the reputation manager operates independently from the anti-malware engine, the anti-malware engine may be upgraded to incorporate new scanning/monitoring methods and procedures, without affecting the operation of the reputation manager.

It will be clear to one skilled in the art that the above embodiments may be altered in many ways without departing from the scope of the invention. Accordingly, the scope of the invention should be determined by the following claims and their legal equivalents.

What is claimed is:

1. A client system comprising at least one hardware processor configured to execute a target entity, a reputation manager, and an anti-malware engine, wherein:
   the reputation manager is configured to:
      in response to receiving a first reputation indicator of the target entity from a reputation server, the first reputation indicator indicative of a probability that the target entity is malicious, transmit the reputation indicator to the anti-malware engine,
      in response to receiving the first reputation indicator, update the first reputation indicator by determining a second reputation indicator of the target entity, the second reputation indicator differing from the first reputation indicator by a reputation change, and
      in response to determining the second reputation indicator, transmit the second reputation indicator to the anti-malware engine and to the reputation server,
      wherein determining the second reputation indicator comprises:
         in response to receiving the first reputation indicator, determining a first time interval,
         in response to determining the first time interval, determining whether the target entity has performed any of a set of pre-determined actions during the first time interval,
         in response, if the target entity has not performed any of the set of pre-determined actions during the first time interval, determining the reputation change to indicate a reduction in the probability that the target entity is malicious, and
         if the target entity has performed a first action of the set of pre-determined actions during the first time interval, determining the reputation change to indicate an increase in the probability that the target entity is malicious; and wherein
   the anti-malware engine is configured to:
      in response to receiving the first reputation indicator, employ a first protocol to determine whether the target entity is malicious, and
      in response to receiving the second reputation indicator, employ a second protocol to determine whether the target entity is malicious, wherein the second protocol is less computationally expensive than the first protocol when the second reputation indicator indicates a decreased probability of malice compared to the first reputation indicator, and wherein the second protocol is more computationally expensive than the first protocol when the second reputation indicator indicates an increased probability of malice compared to the first reputation indicator.

2. The client system of claim 1, wherein the reputation manager is further configured,
   in response to determining the second reputation indicator, to update the second reputation indicator by determining a third reputation indicator of the target entity, the third reputation indicator differing from the second reputation indicator by another reputation change, wherein determining the third reputation indicator comprises:
      determining a second time interval subsequent to the first time interval;
      in response to determining the second time interval, determining whether the target entity has performed any of the set of pre-determined actions during the second time interval;
      in response, if the target entity has not performed any of the set of pre-determined actions during the second time interval, determining the another reputation change to indicate another reduction in the probability that the target entity is malicious; and
      if the target entity has performed a second action of the set of predetermined actions, determining the another reputation change to indicate another increase in the probability that the target entity is malicious.

3. The client system of claim 2, wherein a size of the second time interval is determined according to a size of the first time interval.

4. The client system of claim 2, wherein the another reputation change is determined according to a size of the first time interval.

5. The client system of claim 1, wherein the reputation manager is further configured to determine the reputation change according to a time elapsed since a launch of the target entity on the client system.

6. The client system of claim 1, wherein the first time interval is determined according to a time elapsed since a launch of the target entity on the client system.

7. The client system of claim 1, wherein the first time interval is determined according to the first reputation indicator.

8. The client system of claim 1, wherein the first time interval is determined according to whether the target entity has performed a second action of the set of pre-determined actions prior to the first time interval.

9. The client system of claim 1, wherein the reputation change is determined according to a type of the first action.

10. The client system of claim 1, wherein the reputation change is determined according to whether the target entity has performed a second action prior to the first action.

11. The client system of claim 1, wherein the reputation manager is further configured to,
   in response to determining the second reputation indicator, to update another reputation indicator of another entity executing on the client system, the another entity comprising a component of the target entity, the another reputation indicator indicative of a probability that the another entity is malicious.

12. The client system of claim 1, wherein the first action comprises the target entity injecting a section of code into another entity executing on the client system, and wherein the reputation manager is further configured, in response to determining the third reputation indicator, to determine another reputation indicator of the another entity executing on the client system, the another reputation indicator indicating that the another entity is as likely to be malicious as the target entity.

13. A server computer system comprising at least one hardware processor configured to perform reputation management transactions with a plurality of client systems, wherein a reputation management transaction comprises:
   in response to a request received from a client system of the plurality of client systems, the client system executing a target entity, retrieving a first reputation indicator of a target entity from an entity reputation database, the first reputation indicator indicative of a probability that the target entity is malicious;

in response to retrieving the first reputation indicator, transmitting the first reputation indicator to the client system;

in response to transmitting the first reputation indicator, receiving a second reputation indicator of the target entity from the client system;

in response to receiving the second reputation indicator, comparing the first and second reputation indicators;

in response, when the second reputation indicator indicates a lower probability that the target entity is malicious than indicated by the first reputation indicator, adding the second reputation indicator to a collection of reputation indicators received from the plurality of client systems, wherein all members of the collection are determined for instances of the target entity;

in response to adding the second reputation indicator to the collection, determining whether a reputation update condition is satisfied; and in response, when the update condition is satisfied, replacing the first reputation indicator in the reputation database with an updated reputation indicator determined according to the collection;

wherein the second reputation indicator differs from the first reputation indicator by a reputation change, and wherein determining the second reputation indicator comprises employing the client system to:

in response to receiving the first reputation indicator, determine a first time interval, in response to determining the first time interval, determine whether the target entity has performed any of a set of pre-determined actions during the first time interval, in response, if the target entity has not performed any of the set of pre-determined actions during the first time interval, determine the reputation change to indicate a reduction in the probability that the target entity is malicious, and if the target entity has performed a first action of the set of pre-determined actions, determine the reputation change to indicate an increase in the probability that the target entity is malicious.

14. The server computer system of claim 13, wherein determining whether the update condition is satisfied comprises determining a time elapsed since adding the first member to the collection.

15. The server computer system of claim 13, wherein determining whether the update condition is satisfied comprises determining a count of the members of the collection.

16. The server computer system of claim 13, wherein determining the updated reputation indicator comprises formulating the updated reputation indicator to indicate a highest probability that the target entity is malicious of all members of the collection.

17. The server computer system of claim 13, further configured, in response to receiving the second reputation indicator, to receive from the client system a third reputation indicator determined for the target entity, the third reputation indicator differing from the second reputation indicator by another reputation change, and wherein determining the third reputation indicator by the client system comprises:

determining a second time interval subsequent to the first time interval;

in response to determining the second time interval, determining whether the target entity has performed any of the set of pre-determined actions during the second time interval;

in response, if the target entity has not performed any of the set of pre-determined actions during the second time interval, determining the another reputation change to indicate another reduction in the probability that the target entity is malicious; and if the target entity has performed a second action of the set of predetermined actions, determining the another reputation change to indicate another increase in the probability that the target entity is malicious.

18. The server computer system of claim 13, wherein the reputation change is determined according to a time elapsed since a launch of the target entity on the client system.

19. The server computer system of claim 13, wherein the first time interval is determined according to a time elapsed since a launch of the target entity on the client system.

20. The server computer system of claim 13, wherein the first time interval is determined according to the first reputation indicator.

21. The server computer system of claim 13, wherein the first time interval is determined according to whether the target entity has performed a second action of the set of pre-determined actions prior to the first time interval.

22. A non-transitory computer-readable medium storing a set of instructions which, when executed by a hardware processor of a client system, cause the client system to form a reputation manager and an anti-malware engine, wherein:

the client system is configured to execute a target entity;

the reputation manager is configured to:

in response to receiving a first reputation indicator of the target entity from a reputation server, the first reputation indicator indicative of a probability that the target entity is malicious, transmit the reputation indicator to the anti-malware engine, in response to receiving the first reputation indicator, update the first reputation indicator by determining a second reputation indicator of the target entity, the second reputation indicator differing from the first reputation indicator by a reputation change, and in response to determining the second reputation indicator, transmit the second reputation indicator to the anti-malware engine and to the reputation server, wherein determining the second reputation indicator comprises:

in response to receiving the first reputation indicator, determining a first time interval, in response to determining the first time interval, determining whether the target entity has performed any of a set of pre-determined actions during the first time interval, in response, if the target entity has not performed any of the set of pre-determined actions during the first time interval, determine the reputation change to indicate a reduction in the probability that the target entity is malicious, and if the target entity has performed a first action of the set of pre-determined actions during the first time interval, determining the reputation change to indicate an increase in the probability that the target entity is malicious; and wherein the anti-malware engine is configured to:

in response to receiving the first reputation indicator, employ a first protocol to determine whether the target entity is malicious, and in response to receiving the second reputation indicator, employ a second protocol to determine whether the target entity is malicious, wherein the second protocol is less computationally expensive than the first protocol when the second reputation indicator indicates a decreased probability of malice compared to the first reputation indicator, and wherein the second protocol is more computationally expensive than the first protocol when the second reputation indicator indicates an increased probability of malice compared to the first reputation indicator.

* * * * *